(12) United States Patent
Loce

(10) Patent No.: US 7,006,244 B2
(45) Date of Patent: Feb. 28, 2006

(54) IMAGE RENDERING METHOD AND SYSTEM USING NEGATIVE SIGNALS

(75) Inventor: Robert P. Loce, Webster, NY (US)

(73) Assignee: Xerox Corporation, Stamford, CT (US)

( * ) Notice: Subject to any disclaimer, the term of this patent is extended or adjusted under 35 U.S.C. 154(b) by 639 days.

(21) Appl. No.: 09/731,158

(22) Filed: Dec. 6, 2000

(65) Prior Publication Data

US 2002/0067404 A1 Jun. 6, 2002

(51) Int. Cl.
*G06K 15/00* (2006.01)
(52) U.S. Cl. .......................................... 358/1.2; 358/3.3
(58) Field of Classification Search .................. 358/1.2, 358/1.8, 1.9, 2.1, 3.01, 3.02, 3.06, 3.07, 3.09, 358/3.13, 3.22, 3.23, 3.3; 382/169, 210
See application file for complete search history.

(56) References Cited

U.S. PATENT DOCUMENTS

| | | | |
|---|---|---|---|
| 5,041,848 A | 8/1991 | Gilbert et al. | 346/108 |
| 5,134,495 A | 7/1992 | Frazier et al. | 358/298 |
| 5,144,337 A | 9/1992 | Imamura et al. | 346/108 |
| 5,193,008 A * | 3/1993 | Frazier et al. | 358/1.2 |
| 5,210,572 A | 5/1993 | MacDonald et al. | 355/208 |
| 5,223,857 A | 6/1993 | Loce et al. | 346/108 |
| 5,303,069 A * | 4/1994 | Speciner | 358/3.1 |
| 5,436,706 A | 7/1995 | Landa et al. | 355/256 |
| 5,619,313 A | 4/1997 | Domoto et al. | 399/233 |
| 5,991,578 A | 11/1999 | Liu et al. | 399/169 |
| 6,068,361 A * | 5/2000 | Mantell | 347/15 |
| 6,650,793 B1 * | 11/2003 | Lund et al. | 382/299 |

* cited by examiner

*Primary Examiner*—Jerome Grant, II
(74) *Attorney, Agent, or Firm*—Fay, Sharpe, Fagan, Minnich & McKee, LLP

(57) ABSTRACT

A xerographic marking device includes a source of pixels representative of digitized image information. A rendering image processor analyzes the pixels for an image characteristic, and based on the analysis assigns one of at least three values to each pixel. The three values are selected from a set of values representing positive, negative or neutral relative to a predetermined exposure bias. The device also includes an imaging output device which converts the values assigned to the pixels into areas of selective exposure on a charge retentive surface. A charge on the charge retentive surface such as a photoreceptor accordingly, includes an area of positive charge determined to electrostatically react with a charged monochrome marking agent or toner in a first manner, for example by attraction. The charge also includes a negative charge area which is determined to electrostatically react with the toner in an opposite manner, for example to repel toner. Optionally, the charge also includes an overshoot or super positive/super-negative area. The overshoot areas have stronger electrostatic reactions with the toner than their corresponding positive/negative charges.

19 Claims, 2 Drawing Sheets

IMAGE RENDERING METHOD AND SYSTEM USING NEGATIVE SIGNALS

BACKGROUND OF THE INVENTION

This invention relates generally to electrostatic latent image development, and, more particularly, concerns the use of negative signals in image rendering for printing or display directed toward achieving improved image quality.

Image processing methods and writing devices such as ROSs and image bars typically use rendering signals of a single polarity. That is, they are either on or off. Generally, these single polarity signals are converted for electrostatographic copying and printing by selectively charging and/or discharging a charge receptive imaging member in accordance with an original input document or an imaging signal, generating an electrostatic latent image on the imaging member. This latent image is subsequently developed into a visible image by a process in which charged developing material is deposited onto the surface of the latent image bearing member, wherein charged particles in the developing material adhere to image areas of the latent image. The developing material typically comprises carrier granules having marking or toner particles adhering triboelectrically thereto, wherein the toner particles are electrostatically attracted from the carrier granules to the latent image areas to create a powder toner image on the imaging member. Alternatively, the developing material may comprise a liquid developing material comprising a carrier liquid having pigmented marking particles (or so-called toner solids) and charge director materials dispersed and/or dissolved therein (so-called liquid toner), wherein the liquid developing material is applied to the latent image bearing imaging member with the marking particles being attracted to the image areas of the latent image to form a developed liquid image. Regardless of the type of developing material employed, the toner or marking particles of the developing material are uniformly charged and electrostatically attracted to the latent image to form a visible developed image corresponding to the latent image on the imaging member. The developed image is subsequently transferred, either directly or indirectly, from the imaging member to a copy substrate, such as paper or the like, to produce a "hard copy" output document. In a final step, the imaging member is cleaned to remove any charge and/or residual developing material therefrom in preparation for a subsequent image forming cycle.

The above-described electrostatographic printing process is well known and has been implemented in various forms in the marketplace to facilitate, for example, so-called light lens copying of an original document, as well as for printing of electronically generated or digitally stored images where the electrostatic latent image is formed via a modulated laser beam. Analogous processes also exist in other electrostatic printing applications such as, for example, ionographic printing and reproduction where charge is deposited in image-wise configuration on a dielectric charge retentive surface (see, for example, U.S. Pat. Nos. 4,267,556 and 4,885,220, among numerous other patents and publications), as well as other electrostatic printing systems wherein a charge carrying medium is adapted to carry an electrostatic latent image. It will be understood that the instant invention applies to all various types of electrostatic printing systems and is not intended to be limited by the manner in which the image is formed on the imaging member or the nature of the latent image bearing member itself As described hereinabove, the typical electrostatographic printing process includes a development step whereby developing material including marking or toner particles is physically transported into contact with the imaging member so as to selectively adhere to the latent image areas thereon in an image-wise configuration. Development of the latent image is usually accomplished by electrical attraction of toner or marking particles to the image areas of the latent image. The development process is most effectively accomplished when the particles carry electrical charges opposite in polarity to the latent image charges, with the amount of toner or marking particles attracted to the latent image being proportional to the electrical field associated with the image areas. Some electrostatic imaging systems operate in a manner wherein the latent image includes charged image areas for attracting developer material (so-called charged area development (CAD), or "write white" systems), while other printing processes operate in a manner such that discharged areas attract developing material (so-called discharged area development (DAD), or "write black" systems).

Image quality in electrostatographic printing applications may vary significantly due to numerous conditions affecting latent image formation as well as development, among various other factors. In particular, image development can be effected by charge levels, both in the latent image, as well as in the developing material. For example, when the charge on dry toner particles becomes significantly depleted, binding forces with the carrier also become depleted, causing an undesirable increase in image development, which, in turn, causes the development of the latent image to spread beyond the area defined thereby. Similarly, one problem affecting the control of image quality in ionographic devices involves a phenomenon known as "image blooming" resulting from the effect of previously deposited ions or charge on the path of subsequent ions directed to the charge retentive surface. This problem is particularly noticeable when printing characters and edges of solid areas, resulting in character defects, wherein blooming artifacts may include picture elements being displaced by 1–2 pixels in distance. Image blooming can also be caused by poor charge retention and/or charge migration in the electrostatic latent image on the latent image bearing member, a problem which is particularly prevalent in ionographic systems, wherein a focused beam ion source is utilized for image-wise charging of a dielectric latent image bearing member.

The present invention contemplates and improved method and apparatus using negative signals to achieve increased edge sharpness dot compaction and to solve the above-referenced problems and others.

SUMMARY OF THE INVENTION

In accordance with one embodiment of the present invention, a method of printing a digital image includes receiving a stream of bits representative of pixels in the digital image and analyzing the bits for an image characteristic such as an edge, a corner, or a particular kind of processing already performed on the bits or, desired to be performed subsequently. Based on the analyzing at least one of three different values is assigned to each pixel. The three different values are selected to represent either an attraction, repulsion or neutrality relative to a charged marking agent, or toner.

In accordance with another aspect of the present invention, the method of digital image printing further includes converting the assigned value to an associated electrostatic potential on a charged retentive surface.

In accordance with another aspect of the present invention, where the image characteristic includes a boundary the assigning step includes assigning a value representative of marking agent attraction to a bit on one side of the boundary, and assigning a value representing marking agent repulsion to a bit on the other side of the boundary. Desirably these electrostatic potentials on the charge retentive surface sharpen the boundary.

In accordance with another aspect of the present invention, the converting step includes illuminating a portion of the charge retentive surface with a first writing device for assigned values representative of marking agent attraction. Also a portion of the charge retentive surface is illuminated with a second writing device for assigned values representative of marking agent repulsion.

In accordance with another aspect of the present invention, the method of printing further includes illuminating a portion of the charge retentive surface with the first writing device having a first spot size, and illuminating a portion of the charge retentive surface with the second writing device using a second or different spot size.

In accordance with another aspect of the present invention, the method further includes illuminating the charge retentive surface in a high-addressable direction for the first writing device, i.e. in the fast scan direction for a raster output scanner. Also, the method includes illuminating the charge retentive surface in a high-addressable direction perpendicular to the first writing device, i.e. in the slow scan or process direction for an LED light bar.

In accordance with another aspect of the present invention, where a particular assigned value on a pixel indicates that additional processing is to be performed on either that pixel or a set of the stream of pixels, the method further includes searching for the particular assigned value such as a repulsion value, and based on the searching, performing the processing indicated by the particular assigned value.

In accordance with another embodiment of the present invention, a charge on a charge retentive surface includes a positive charge that is greater than that achieved by an exposure bias. The positive charge is determined to electrostatically react with a charged monochrome marking agent in a first manner. The charge further comprises a negative charge that is less than that achieved by the exposure bias. The negative charge is determined to electrostatically react with the charged marking agent in a manner opposite to the first manner.

In accordance with another aspect of the present invention, the charge on a charge retentive surface further includes a super positive charge that is greater than the positive charge. The super positive charge is determined to electrostatically react with the charged marking agent in the first manner.

In accordance with another aspect of the present invention, the charge on a charge retentive surface further includes a super negative charge that is less than the negative charge. The super negative charge is determined to electrostatically react with the charged marking agent in a manner opposite to the first manner.

In accordance with another embodiment of the present invention, a xerographic marking device includes a source of bits representative of digitized image information. A rendering image processor is also included which analyzes the bits for an image characteristic, and based on the analysis assigns one of at least three different values to each pixel. The at least three different values are selected from a set of values which represent positive, negative or neutral relative to a predetermined exposure bias.

In accordance with another aspect of the present invention, where the image characteristic indicates subsequent image processing such as halftoning, error diffusion, image enhancement, and the like, the rendering image processor further includes a processor which identifies a particular value and performs the subsequent image processing.

Another aspect of the present invention is a halftoning process that includes examination of neighboring pixels to determine image edge characteristics. When suitable edge characteristics are found the halftoning method generates super positive and super negative values for pixels that will cause the generation of super positive and super negative exposure negative levels.

Another aspect of the present invention is a template matching process for modification of image features such as line art edges. The template matching process may be of the one of the equivalent forms (logic, look-up tables, circuits) and be directed toward the common applications of processing line art (resolution conversion, resolution enhancement, appearance tuning, appearance matching, corner sharpening, ink trap deepening) or the template matching could be applied solely for enhancement using the at least 3 levels method. The template matching process will possess output values of at least three levels to be used in marking as described herein.

Another aspect of the present invention concerns super positive values, and super negative values in an image processing precompensation method for the precompensation of spatially varying imager performance. Either or both super positve and super negative values can be generated in an image processing method that applies an inverse to the degradation caused by spatially varying imagers such as image bars.

In accordance with another aspect of the present invention, the xerographic marking device further includes a first charge altering writer which, in accordance with the assigned value for each pixel, selectively alters a charge on portions of a photoreceptor to electrostatically react with a marking agent in a first manner.

In accordance with another aspect of the present invention, the xerographic marking device further includes a positive charge on the photoreceptor in a location corresponding to the image characteristic and a negative charge on the photoreceptor adjacent to the positive charge. The positive charge electrostatically reacting with the marking agent in the first manner and the negative charge electrostatically reacting with the marking agent in other than the first manner.

In accordance with another aspect of the present invention, the xerographic marking device further includes a second charge-altering writer. The second charge altering writer selectively altering a charge on portions of the photoreceptor to electrostatically react with a marking agent in other than the first manner, in accordance with the assigned value for each pixel.

In accordance with another aspect of the present invention, the xerographic marking device further includes a first charge-altering writer having a first spot size which selectively alters a charge on a photoreceptor to electrostatically react with a marking agent in a first manner.

In accordance with another aspect of the present invention, the xerographic marking device further includes a second charge-altering writer having a second spot size which selectively alters the charge on the photoreceptor in other than the first manner.

One advantage of the present invention resides in the use of negative values in rendering image processing algorithms such as halftoning, error diffusion, and resolution enhancement.

Another advantage of the present invention resides in the use of template matching or high pass filtering on edges, halftoned images, and other conventionally rendered images to generate overshoot signals.

Another advantage of the present invention resides in the ability to use a variety of imaging optics to achieve different spot sizes to tune edge shape, particularly for overshoot and undershoot.

Yet another advantage of the present invention resides in the ability to use imaging objects with more than one "on" exposure level.

Still another advantage of the present invention resides in the use of negative signals to pre-compensate for later processing which will have a low pass filter effect, or for degradations or variations caused by the imaging devices themselves.

Still another advantage of the present invention resides in the use of negative signals to encode object information.

Still further advantages of the present invention will become apparent to those of ordinary skill in the art upon reading and understanding the following detailed description of the preferred embodiments.

BRIEF DESCRIPTION OF THE DRAWINGS

The invention may take physical form in parts and arrangements of parts, and in certain steps and arrangements of steps. The drawings are only for purposes of illustrating the preferred embodiments and are not to be construed as limiting the invention.

DETAILED DESCRIPTION OF THE PREFERRED EMBODIMENT

Figure 1:
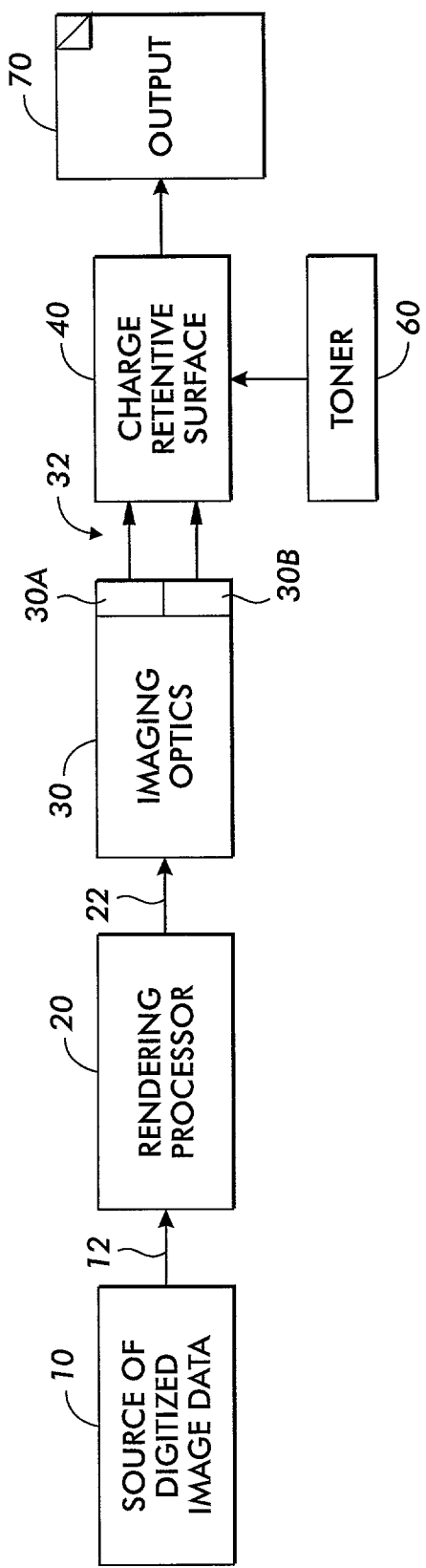
FIG. 1 is a diagrammatic illustration of a xerographic imaging apparatus incorporating the present invention.

With reference to FIG. 1, a xerographic marking device includes a source of digitized image data 10 which provides a stream of digital bits 12 to a rendering processor 20. The source 10 can be any of a variety of devices such as a scanner, a computer, a postscript interpreter or other processor and the like. The rendering processor 20 performs a variety of manipulations dependent on the image received. Among the variety of rendering algorithms two key classes of processes are apparent dependent on input image type. These image types are line art and contone or pictoral image information. For line art numerous techniques such as template matching are available which enhance, restore or interpolate bits to induce the appearance of smooth, appropriately positioned edges and/or transitions. Contone images on the other hand typically attempt to preserve as much gray-level image data as possible and employ techniques such as halftoning and error diffusion. As will become clearer below, attaching negative signals to selected bits in the rendering processor provides advantages for both the line art and contone image environments.

With continued reference to FIG. 1, values 22 are sent from the rendering processor 20 to an imaging output device 30 including imaging optics to generate a signal that alters the charge on a photoconductor. The imaging output device 30 or charge altering device selectively expose areas of a charge retentive surface 40. In one preferred embodiment, laser light 32 is scanned across a photoreceptor in the manner of a raster output scanner 30A altering a uniform electrostatic charge into a charge representation of the image data 10. Alternatively, an LED array or image bar 30B may be employed with a plurality of light sources selectively illuminating portions of the charged retentive surface 40. In still another embodiment, imaging output device 30 can include multiple imagers. A particularly advantageous aspect of this embodiment is to employ at least two imagers, such as ROS 30A and image bar 30B, which are high addressable in different, perpendicular, directions.

Once a latent image is deposited onto the charged retentive surface 40, toner 60 is attracted, for example, to the light exposed areas providing a latent image on the charge retentive surface 40. This image is transferred to an output media, is fused and the output 70 provided to a user.

Figure 2:
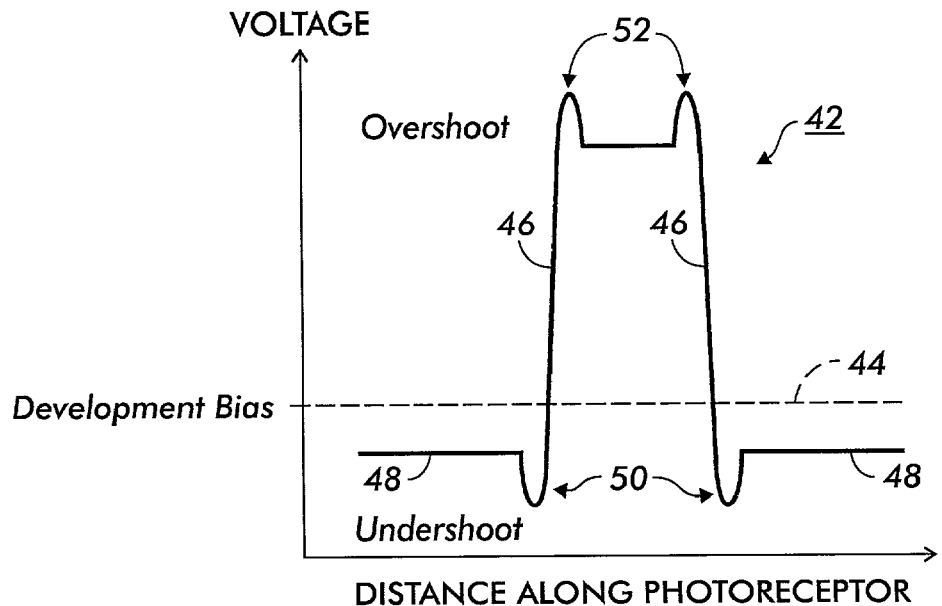
FIG. 2 is an illustration of a charge on a photoreceptor according to one embodiment of the present invention; and, FIG. 3 is an embodiment of a processor adapted to suitably practice the present invention.

With reference now to FIG. 2, a plot representative of an exemplary charge 42 on the charge retentive surface 40 is illustrated. A development bias 44 indicates a voltage or charge at which the toner or marking agent electrostatically reacts with the photoreceptor such that a mark will be placed on the output. As illustrated, the charge includes a positive charge 46 which is defined as a charge achieved by an exposure greater than an exposure bias 48. The positive charge 46 electrostatically reacts with the toner, for example by attracting/repelling toner to/from the positively charged area. For example, negatively charged toner is attracted to the photoreceptor in areas where positive charge 46 exists. Continued reference to FIG. 2 illustrates negative charge areas 50 defined as less than the exposure bias 48. To continue the previous example, the negative charge areas 50 electrostatically react with the charge toner in a manner opposite that of the positive charge areas 46. For example, the negatively charged areas 50 tend to repel the similarly charged toner enhancing the image characteristics such as corners or edges.

Optionally, the charge may also include a super positive charge 52 at selected locations on the photoreceptor. The super positive charge 52 is defined as greater than the positive charge but will electrostatically react with the toner in the manner of the positive charge further refining the image. As can be now observed, the combination of negative charge 50 and super positive charge 52 effectively steepens or sharpens the edge between areas of no toner and areas of toner, enhancing transition areas. Those skilled in the art will appreciate that a super-negative charge (not shown) preceding the image transition or edge will further enhance the process taught herein. Moreover, employing only one of the super-negative or super positive charges will not appreciably change the slope of the edge. Accordingly, as used herein, the term "overshoot" is intended to include both the case of undershoot or super-negative, as well as the case of super-positive.

Figure 3:
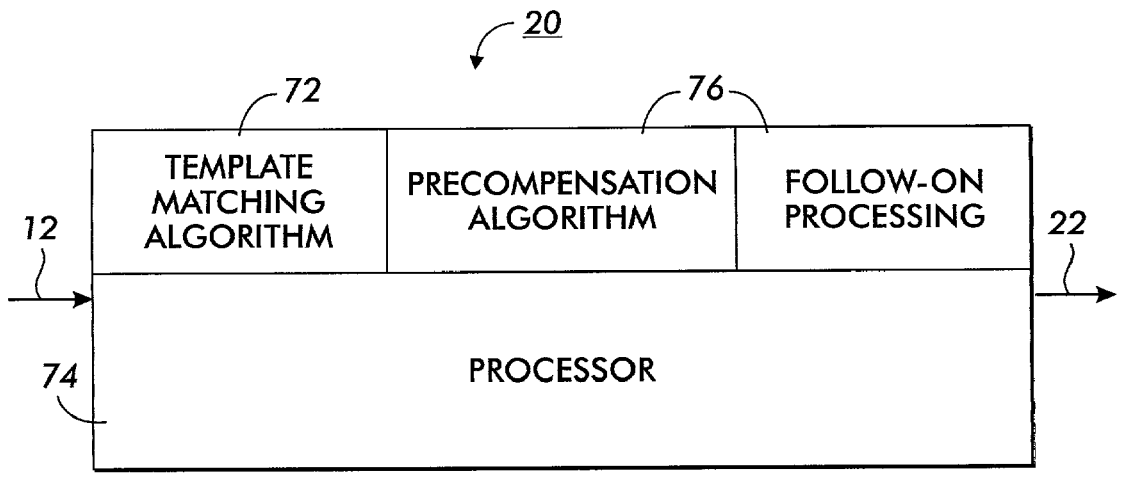

With reference now to FIG. 3, an embodiment of the rendering processor 20 is illustrated. An image processing component 72 analyzes the incoming stream of bits 12 for an image characteristic. The image characteristics subject to detection include transitions such as an edge in line art, textural image area or areas indicating the desirability of further processing. When the image characteristic is identified, the image processing component 72 assigns a follow on processing value, such as negative, positive, or neutral. However, instead of, or in addition to indicating a physical charge value, a processor 74 examines the value and selects or identifies subsequent imaging processing algorithms 76. As an example, negative values can be used as a pseudo-encoding scheme or indicator. Rather than carry a tag bit with an image component to describe its local characteristics, negative values surrounding, or adjacent to, an object signal special rendering treatment for that object or stream of bits. For example, the pseudo-encoding can indicate a selection of different tone reproduction curves, halftoning screens, color or monochrome rendering algorithms, and the like.

In addition to identifying subsequent processing, negative values surrounding a set of bits could identify image type. For instance, a negative value on either side of a line could indicate that the pixels between the negative values should be rendered as a line object by processor 74. The pixels possessing negative values when used as a pseudotag could be rendered using the values of neighboring pixels or receive other special treatment. Additionally, scaling operations tend to have a built-in low-pass filter effect. Prior to scaling, some form of high pass filtering may be performed. At edges, negative values may occur. Retaining the negative value, rather than truncating it, can lead to a compensation for the subsequent scaling.

Consider application in the halftone setting for improved rendering of contone images. For several reasons the halftoning community greatly desires the ability to use a very small minimum cluster of toner, but often the stability of the marking process for such an image structure is not adequate. In conventional clustered dot screening, a small, stable, compact cluster would allow fine gray-level gradations and low noise in highlights. In error diffusion and stochastic screening it would allow for stability of the many isolated pixel events that result. Here, the use of negative values about small clusters makes development at the edges (fringe fields) exceptionally strong, thereby yielding strong and stable development. See FIG. 2, which also shows a overshoot level about an edge of a halftone dot.

To generate the digital signals for such a halftone dot in the halftone algorithm, the algorithm itself could use neighboring pixel information and assign negative values next to positive values for undershoot, and possibly assign a second level of positive values at the inner dot edges for overshoot. As an example consider the following process. Rather than employ conventional pixel-by-pixel thresholding with halftone values, pixels within a cell, portion of a cell or collection of cells could be thresholded, then that cell is examined for edges. When suitable edge characteristics are found the halftoning method can generate super positive and super negative values for pixels that will cause the generation of super positive and super negative exposure negative levels. This edge enhancement process can be considered part of the halftoning process, or as including a conventional halftoning or error diffusion algorithm that is followed by a form of template matching or high pass filtering to assign the negative and superpostive values.

In error diffusion, halftoning is a thresholding and error propagation process. Negative values for pixels are naturally generated as part of the error propagation process. Instead of allowing only positive quantization levels in the thresholding step, one or more negative quatization levels could be allowed thereby creating levels according to the present invention. Or similar to the above halftoning method, conventional error diffusion may be applied and followed by a template matching process that identifies edges and generates output signals with negative and/or superpositive values.

Similarly negative, super-negative, positive and, super positive writing signals are also used for the edges of line art. For line art edges the result is a sharper, stronger edge possessing lower noise. For fine line art, around one pixel in width, the result is stable, reliable development, similar to the halftone case. The negative values in the digital image are generated with a template matching operation possibly as part of resolution enhancement, a high pass filter, or a special feature in a decomposer, in one embodiment of the present invention. The template matching filter recognizes the appropriate edge condition, and generates a negative output signal. The template matching process encompasses any of the equivalent forms (logic, look-up tables, circuits, and the like) and is directed toward the common applications of processing line art (resolution conversion, resolution enhancement, appearance tuning, appearance matching, corner sharpening, ink trap deepening) or the template matching could be applied solely for enhancement using the at least 3 levels method. The template matching process will possess output values of at least three levels to be used in marking as described herein.

Another aspect of the present invention concerns super positive values, and super negative values in an image processing precompensation method for the precompensation of spatially varying imager performance. Either or both super positve and super negative values can be generated in an image processing method that applies an inverse to the degradation caused by spatially varying imagers such as image bars.

In yet another embodiment, negative values are used where precompensation is employed on images to correct for errors estimated or predicted to be induced on images at output. For example, certain errors can be reliably measured and corrected for particular types of output terminals through the use of look up tables and the like. Specifically, registration errors are determined for individual ROS's and/or LED bars and corrections stored for application prior to output. See generally, U.S. application Ser. No. 09/559,198 filed Apr. 27, 2000, incorporated herein by reference, for discussion of precompensation.

Those skilled in the art can now appreciate, that image writing devices having different high addressability directions (i.e. ROSs and LED bars), or different spot sizes can cooperatively interact to form desired charge curves on the charge retentive surface. In the example of different or variable spot sizes, a large spot size can be used for coarse charge placement while a small spot size can refine the charge to a desired profile with appropriate negative and super positive values.

The invention has been described with reference to the preferred embodiments. Modifications and alterations will naturally occur to others upon reading and understanding the preceding detailed description. It is intended that the invention be construed as including all such modifications and alterations insofar as they come within the scope of the appended claims, or the equivalents thereof

What is claimed is:

1. A method of printing a digital image including:
   receiving a stream of pixels representative of the digital image;
   analyzing a set of the pixels for an image characteristic; and
   based on the analyzing, assigning one of at least three different values to each pixel, wherein the three different values are selected from a set of values including at least one value representative of an attraction relative to a marking agent, at least one value representative of a repulsion relative to the marking agent, and at least one value representative of a neutrality relative to the marking agent.

2. The method of printing a digital image as set forth in claim 1, where a particular assigned value indicates additional processing to be performed on a set of the stream of pixels, the method further comprising:
  searching for the particular assigned value; and
  based on the searching, performing the processing indicated by the particular assigned value.

3. The method of printing a digital image as set forth in claim 1, where the analyzing includes template matching the stream of pixels to identify the image characteristic, the method further comprising:
  assigning an overshoot value to a pixel on a border of the image characteristic.

4. The method of printing a digital image as set forth in claim 1, where the analyzing includes halftoning the stream of pixels and comparing neighboring pixels to detect the image characteristic, the method further comprising:
  assigning an overshoot value to a pixel adjacent to the detected image characteristic.

5. The method of printing a digital image as set forth in claim 1, where the image characteristic comprises pixels rendered to compensate for spatial image variations induced by an imaging output device.

6. The method of printing a digital image as set forth in claim 1, further including for each pixel, converting the assigned value to an associated electrostatic potential on a charge retentive surface.

7. The method of printing a digital image as set forth in claim 6, where the image characteristic includes a boundary, the assigning comprising:
  assigning a value representative of marking agent attraction to a pixel on one side of the boundary; and
  assigning a value representative of marking agent repulsion to a pixel on an other side of the boundary, wherein opposing electrostatic potentials on the charge retentive surface sharpen the boundary of marking agent on the charge retentive surface.

8. The method of printing a digital image as set forth in claim 6, where the converting comprises:
  illuminating a portion of the charge retentive surface with a first writing device for assigned values representative of marking agent attraction; and
  illuminating a portion of the charge retentive surface with a second writing device for assigned values representative of marking agent repulsion.

9. A charge on a charge retentive surface in a xerographic marking device, the charge comprising:
  a positive charge, greater than an exposure bias, determined to electrostatically react with a charged monochrome marking agent in a first manner;
  a negative charge, less than the exposure bias, determined to electrostatically react with the charged marking agent in a manner opposite the first manner and;
  a super-negative charge, less than the negative charge which reacts with the marking agent in a manner opposite the first manner.

10. The charge on a charge retentive surface as set forth in claim 9, further comprising a super-positive charge, greater than the positive charge, determined to electrostatically react with the charged marking agent in the first manner.

11. A xerographic marking device comprising:
  a source of pixels representative of digitized image information;
  a rendering image processor which analyzes the pixels for an image characteristic, and based on the analysis assigns one of at least three values to each pixel, wherein the three values are selected from a set of values including at least one value representing a positive relationship relative to a predetermined exposure bias, at least one value representing a negative relationship relative to the exposure bias, and at least one value representing a neutral relationship relative to the exposure bias; and
  an imaging output device which converts the values assigned to the pixels into areas of selective exposure on a charge retentive surface.

12. The xerographic marking device as set forth in claim 11, where the image characteristic indicates subsequent image processing to be performed on the pixel, the rendering image processor further comprising:
  a processor which performs the subsequent image processing in response to receiving the pixel having the image characteristic.

13. The xerographic marking device as set forth in claim 11, where the image characteristic comprises a compensation for variations attributable to an imaging output device, the processor further assigning values reflecting the compensation for the pixel.

14. The xerographic marking device as set forth in claim 11, where the processor includes a template matching algorithm which identifies the image characteristic in the stream of pixels, the processor further assigning an overshoot value to a pixel bordering the identified image characteristic.

15. The xerographic marking device as set forth in claim 11, where the processor includes a thresholding and error propagation algorithm, the processor further combining negative errors induced by thresholding and assigning a negative value representing the negative error.

16. The xerographic marking device as set forth in claim 11, further comprising:
  a super-positive charge on the photoreceptor in a location corresponding to the image characteristic, the super-positive charge electrostatically reacting with a marking agent in a first manner.

17. The xerographic marking device as set forth in claim 11, further comprising:
  a super-negative charge on the photoreceptor in a location corresponding to the image characteristic.

18. The xerographic marking device as set forth in claim 11, further comprising:
  a first charge altering writer having a first spot size which selectively alters a charge on a photoreceptor to electrostatically react with a marking agent in a first manner.

19. The xerographic marking device as set forth in claim 18, further comprising:
  a second charge altering writer having a second spot size which selectively alters the charge on the photoreceptor in other than the first manner.

* * * * *